Patented May 16, 1933

1,908,719

UNITED STATES PATENT OFFICE

EDWARD A. WILLSON, OF AKRON, OHIO, ASSIGNOR TO AMERICAN ANODE, INC., OF AKRON, OHIO, A CORPORATION OF DELAWARE

METHOD FOR MAKING SHAPED RUBBER ARTICLES

No Drawing.   Application filed December 19, 1929.   Serial No. 415,362.

This invention relates to the art of rubber manufacture, and particularly to the manufacture of shaped rubber articles directly from latex or analogous aqueous dispersions of rubber or rubber-like substances by an improved and simplified method.

Heretofore the rubber contained in aqueous dispersions such as latex has been deposited on forms by alternate dipping and drying, or by electrophoresis, or by impregnating porous forms with a coagulant and immersing them in the dispersions, or by applying suction to the interior of porous forms to remove the serum from the dispersions and leave the rubber in a uniform layer on the surface of the form. All these prior methods require a careful adjustment of properties of the latex, or require complicated and expensive apparatus, or require that the molds be very carefully prepared and even more carefully cleaned after each manufacturing cycle, all of which greatly increases the cost of the finished articles made by such processes.

By the method of the present invention rubber articles may be manufactured or objects may be rubber coated in a very short time with the minimum of apparatus and of handling, even when the form or object is of a complicated shape. The base upon which the rubber is deposited may be of any substantially impermeable substance such as glass, glazed porcelain, metal, wood, bakelite, ebonite, or even rubber. If it is to be provided with a permanent rubber coating, it is preferably coated with a suitable adhesive, such as the tough, heat-plastic, balata-like rubber isomer prepared by the reaction of rubber with sulphonic acids, and described by Harry L. Fisher in the United States Patent No. 1,605,180, granted November 2, 1926, or any other substance which will secure the rubber firmly to the base. If the base is merely a form on which articles are to be formed and then stripped off either before or after drying and vulcanization, it is preferably made of a material which is substantially unaffected by the coagulant which is employed. Glass, porcelain, stainless steel and aluminum are particularly suitable.

According to the method of this invention the base is coated with a solution of a coagulant by any suitable method such as by dipping or spraying, and the excess solvent is eliminated, preferably by evaporation. The base thus coated with a substantially uniform film of coagulant is immersed in a coagulable aqueous dispersion of rubber or like substance. The coagulant diffuses into the dispersion and coagulates a continuously increasing layer of rubber thereon. When the layer of coagulated rubber has attained the desired thickness the base together with its rubber coating is removed from the dispersion. If it is desired that the rubber possess a high electrical resistance or that it be substantially unaffected by moisture the coagulated layer may be washed in running water to remove water-soluble substances, including the coagulant.

The coagulant employed may consist of a liquid acid, or of a solid acid or of a coagulating salt, or even of an organic liquid capable of coagulating aqueous dispersions, dissolved in a volatile solvent. Preferably, the coagulant should be completely soluble in water, in order that it may diffuse rapidly and readily into the surrounding aqueous dispersion. The film remaining on the deposition base after the evaporation of the volatile solvent should contain a high concentration of an active coagulant which is capable of coagulating aqueous dispersions to a firm gel; it should wet the base so that a continuous film and not a mere series of isolated droplets is formed thereon; it should itself be readily wet by the aqueous rubber dispersion; and should not be completely precipitated or otherwise rendered inoperative upon coming in contact with the aqueous dispersion, which is normally a more or less strongly alkaline liquid.

In its most valuable form the coagulant liquid comprises a solution of a non-volatile acid, or a coagulating salt, or a mixture of a coagulating salt and an acid, in a mixture of a volatile solvent and a slightly volatile or non-volatile solvent, all the constituents of the solution preferably being water-soluble. When the deposition base is coated with such a solution, as by dipping, the volatile solvent rapidly evaporates and leaves a semi-solid or viscous liquid film of coagulant on the surface thereof; the coagulating film, because of its viscosity or semi-solid nature, not tending to flow to the lower extremities of the base and not being subject to displacement upon immersion of the coated base in the aqueous rubber dispersion.

The coagulating substance itself is preferably a salt of a polyvalent metal. The salts of the bivalent metals such as magnesium, the alkaline earths, zinc, copper, cobalt, cadmium, ferrous iron, lead, nickel, and manganese are preferred, but the salts of tri- and tetravalent metals such as aluminum, ferric iron, antimony, chromium, molybdenum, tin, thorium, vanadium, and zirconium may also be used. In general, the chlorides and nitrates of these metals are the most useful because of their availability and their great solubility in water and organic solvents, but the bromides, iodides, fluorides, chlorates, bromates, perchlorates, sulphates, persulphates, thiosulphates, permanganates, chromates, hypophosphites, thiocyanates, nitrites, acetates, formates, salicylates, lactates, oxalates, etc. of some of the metals are sufficiently soluble in water and other solvents to merit consideration. Many of these coagulating salts are soluble in organic solvents such as methyl, ethyl, or amyl alcohol; glycol or glycerine; acetone, ether; ethyl acetate or other esters; carbon disulphide; chloroform; etc.

When the coagulant is dissolved in a mixture of two solvents of different volatility, the more volatile solvent is conveniently one of the volatile organic solvents, preferably one in which rubber does not swell appreciably, such as methyl or ethyl alcohol, acetone, or even ethyl formate or acetate, although water may also be employed as the volatile medium. The less volatile solvent may be water, or one of the higher monohydric alcohols, or a water-soluble ester, or glycol or glycerine. In many cases it will not be found necessary to add water as such, since a solution of hydrated salt in a volatile organic solvent, upon evaporation of the major portion of the volatile solvent will frequently leave a residue containing just the proper concentration of water and of the volatile solvent to be liquid and yet possess a very high viscosity. In other cases the salt or the solvent or both will be sufficiently hygroscopic that the moisture absorbed from the atmosphere during the evaporation of the volatile solvent will confer upon the remaining salt or other coagulant a fluidity just sufficient to cause it to form a uniform film without appreciably flowing over the surface of the base after the evaporation of the volatile solvent.

If the coagulant itself is liquid, or if its saturated solutions are quite fluid, it may be found advantageous to employ a viscous liquid such as glycerine, or a heavy syrup, as the non-volatile portion of the solvent used. It may even be found advantageous to add colloids such as gum arabic, a cellulose ester, polymerized vinyl acetate, or other substances miscible with the coagulant and the various solvents, for the purpose of increasing the viscosity of the film remaining after the evaporation of the volatile portion of the solvent.

The coagulation of latex or other rubber dispersions by means of salts of polyvalent metals appears to present many advantages over acid coagulation. In particular, the structure of the coagulum appears to be such that a firm, well-coagulated deposit which can be submitted to ordinary handling operations is secured, that the deposit may be dried quickly and without difficulty, and that the dry rubber is of the very highest quality in every respect. However, many of the polyvalent metals form insoluble hydroxides or oxides in an alkaline solution. Consequently, when salts of these metals are employed as coagulants, a thin film of rubber is coagulated by the salts, but the hydroxide or oxide of the metal is precipitated within this film, by the alkaline dispersion medium, and a further diffusion of the salts and a building up of a layer of coagulum of progressively increasing thickness is effectively checked. This difficulty may be overcome by adding an acid to the coagulant so that the diffusion of the acid along with the coagulant salt maintains the coagulum in an acid state and prevents the precipitation of insoluble hydroxides. The acid should of course be one which does not react with the salt to form an insoluble precipitate. It is preferred, however, to employ a salt of a metal such as calcium, whose hydroxide is fairly soluble, even in alkaline solutions.

The aqueous dispersion which is coagulated by the hereinabove described method may be a natural latex of caoutchouc, gutta-percha, balata or similar vegetable resin, or it may be an artificial dispersion of any of the above substances or of synthetic rubber, reclaimed rubber, rubber isomers, or like substances or a mixture of any such natural or artificial dispersions. It may contain added pigments, fillers, softeners, or conditioning agents such as sulphur and accelerators, such added ingredients preferably being dispersed simultaneously with the rubber or rubber-like substance, or being intimately dispersed in water and then mixed with the main body of the dispersion. All such dispersions will hereinafter for convenience be referred to as "aqueous rubber dispersions".

The base or article upon which the deposit is produced will likewise be generally termed a "form" whether the deposit is to remain thereon as a permanent coating or is to be removed therefrom after it has attained sufficient strength to hold its shape.

*Example 1.*—A vulcanizable latex composition is prepared by dispersing the desired pigments and vulcanizing agents intimately in water and mixing the dispersions with latex. For example, the quantity of concentrated latex which contains 100 parts by weight of rubber is mixed with dispersions containing 10 parts of zinc oxide, 3 parts of sulphur, 0.5 parts of an organic accelerator, and 1 part of lampblack, the completed mixture containing about 50% water. Rubber derived from this composition is suitable for making soft rubber articles such as inner tubes, rubber bands, rubber gloves, bath caps, etc. If a colored rubber is desired a suitable dye is substituted for the lampblack.

If gloves are to be made, the glove forms, for example of glazed porcelain, are thoroughly cleaned and then dipped in a coagulant liquid made by dissolving 100 parts by weight of hydrated calcium nitrate $Ca(NO_3)_2.4H_2O$ in 200 parts of acetone. The forms are removed from the coagulant solution, and inverted to allow the film of coagulant to distribute itself uniformly over the surface of the form. After a period of from 30 seconds to 1 minute the major portion of the acetone has evaporated leaving a uniform viscous film of concentrated calcium nitrate solution on the surface of the form. The form is then dipped in the above latex composition for about 10 minutes, during which time the calcium ions diffuse slowly into the latex and coagulate a layer of vulcanizable rubber of uniform thickness on the surface of the form. The form with the adhering rubber deposit is removed from the latex and immersed for four hours in a tank of running hot water which leaches out the coagulant and the water-soluble substances originally contained in the latex or the other dispersions. The washed deposit, still on the form is then dried, for example in a forced circulation dryer at 150° F., and is vulcanized in open steam in the usual manner. The vulcanized glove is stripped from the form, which is immediately ready to be employed again. The thickness of the rubber in the gloves produced by the above process is about 0.05 in. but the thickness is readily varied by changing the time of immersion of the coagulant-coated form in the latex.

*Example 2.*—A metal impeller for a blower which is to be used for handling corrosive gases is carefully cleaned, preferably by sandblasting, and is coated with an adhesive, for example by dipping in a benzol solution of the rubber isomer described above. The solvent is allowed to evaporate and the impeller is dipped in a solution of 100 parts of commercial anhydrous calcium nitrate in 200 parts of acetone. Adhering drops are removed by shaking or whirling the impeller, which is then rotated slowly while the major part of the acetone is permitted to evaporate. It is next plunged beneath the surface of a latex mixture, for example the composition described in Example 1 above, being held at such an angle, and if necessary being so rotated that air bubbles cannot be entrapped in or on the impeller. After the desired thickness of rubber is coagulated on the surface, 5 or 10 minutes usually being sufficient, the impeller is removed, washed in running water, dried, and vulcanized. The rubber covers the entire surface with a smooth, flawless, uniform and perfectly adherent coating which effectively protects the underlying metal from corrosion as well as from the abrasive action of suspended solid particles.

*Example 3.*—A hard rubber composition is prepared by mixing the following ingredients in the form of concentrated aqueous dispersions: Rubber (contained in latex) 100 parts by weight, zinc oxide 2 parts, sulphur 45 parts, organic accelerator 4 parts, inert pigment 10 parts, and lampblack 2 parts.

A pressed metal steering wheel spider is freed from grease and scale and is dipped in a solution of 40 parts by weight of calcium chloride and 10 parts of lactic acid in 80 parts of methyl alcohol. The major portion of the alcohol is allowed to evaporate and the spider is immersed in the hard rubber composition for 15 minutes. After drying and vulcanizing in heated air the steering wheel is ready for use, no buffing or polishing being required.

In each of the above examples a specific coagulant solution has been specified by way of example, but it will be understood that their use is not limited thereby, but that each coagulant solution may be employed generally in accordance with the general directions hereinabove set forth. In addition a solution of 10 parts by weight of citric acid and 1 part of glucose (corn syrup) in 100 parts of acetone, or a saturated solution of calcium lactate or barium salicylate in denatured alcohol are very useful in the method of this invention. Solutions which are particularly useful in the manufacture of thin high grade rubber goods such as surgeons gloves contain 10 parts by weight of zinc chloride or basic lead acetate dissolved in a mixture of 40 parts methyl alcohol and either 10 parts isopropyl alcohol, 5 parts normal butyl alcohol, or 2 parts ethylene glycol.

Ordinarily the best results are obtained by employing coagulant solutions which are completely soluble in water, in order that the constituents thereof may readily diffuse into the latex or equivalent dispersion during the coagulation, and may readily be eliminated from the completed article by a simple washing, but this invention is not limited to such solutions only.

It is important that the film remaining on the surface of the form after the evaporation of the volatile solvent possess a high viscosity in order that there be no tendency for it to float off the form and form a coagulated skin on the surface of the latex when the form is immersed therein. Another difficulty which may arise if the film of coagulant is too thick or too fluid, is that the residual coagulant on the surface of the form after the rubber is coagulated may lubricate the rubber sufficiently to cause it to slip over the surface of the form and wrinkle or otherwise become damaged. If this trouble occurs the proportion of volatile solvent should be increased and the proportion of non-volatile solvent, if possible, decreased. In some cases the solvent may be completely eliminated from the coagulant film on the form, leaving a film of solid coagulant on the form, but if a smooth inner surface is desired on the finished rubber article the coagulant should not be allowed to crystallize.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The method of producing deposits from an aqueous rubber dispersion, which comprises coating an impervious form with a liquid coagulant comprising a salt of a polyvalent metal and a volatile solvent, evaporating at least a part of the said solvent, and immersing the coated form in the said dispersion.

2. The method of producing deposits from an aqueous rubber dispersion, which comprises dissolving a salt of a polyvalent metal in a mixture of a volatile solvent and a less volatile solvent, applying the said solution to an impervious form, allowing at least a portion of the volatile solvent to evaporate, and immersing the form in the said dispersion.

3. The method of producing deposits from an aqueous rubber dispersion, which comprises coating an impervious form with a solution of a chloride or nitrate of a polyvalent metal in a solvent comprising a volatile liquid, evaporating at least a part of the said volatile liquid, and immersing the coated form in the said dispersion.

4. The method of producing deposits from an aqueous rubber dispersion, which comprises coating an impervious form with a solution of a chloride or nitrate of an alkaline earth in a solvent comprising a volatile liquid, evaporating at least a part of the said volatile liquid, and immersing the coated form in the said dispersion.

5. The method of producing deposits from an aqueous rubber dispersion, which comprises coating an impervious form with a solution of a salt of a polyvalent metal in a volatile solvent, causing the solvent to evaporate until the film of coagulant has attained a substantial viscosity without solidifying, and immersing the form in the said dispersion.

6. The method of producing deposits from an aqueous rubber dispersion, which comprises coating an impervious form with a solution of a salt of a polyvalent metal in a mixture of a volatile organic solvent and a less volatile solvent, said solvents being incapable of dissolving rubber, causing the evaporation of the major portion of the volatile solvent, and immersing the form in the said dispersion.

7. The method of producing deposits from an aqueous rubber dispersion, which comprises coating an impervious form with a solution of a readily soluble salt of a polyvalent metal in a mixture of water and a volatile organic solvent incapable of dissolving rubber, causing the evaporation of the major portion of the volatile solvent, and immersing the form in the said dispersion.

8. The method of producing deposits from an aqueous rubber dispersion, which comprises coating an impervious form with a solution of a readily soluble salt of a bivalent metal in a mixture of a volatile alcohol and water, causing the evaporation of the major portion of the alcohol, and immersing the form in the said dispersion.

9. The method of producing deposits from an aqueous rubber dispersion which comprises dissolving a hydrated salt of a bivalent metal in a volatile organic solvent incapable of dissolving rubber, coating an impervious form with the solution, causing the evaporation of the major portion of the volatile solvent, and immersing the form in the said dispersion.

10. The method of producing rubber articles from aqueous rubber dispersions which comprises coating an impervious form with a solution comprising a solid non-volatile coagulant, a volatile organic solvent, and a small proportion of a substantially non-volatile, water-soluble organic hydroxyl compound, causing the evaporation of the major portion of the volatile solvent, and immersing the form in the said dispersion.

11. The method of producing rubber articles from aqueous dispersions which comprises dipping an impervious form in a solution of a coagulating salt in a mixture of methyl alcohol and a small proportion of a substantially non-volatile liquid alcohol, causing the evaporation of the major portion of the methyl alcohol from the liquid film on the surface of the form, and immersing the form in the said dispersion.

12. The method of producing rubber articles which comprises coating an impervious form with a film of a solution comprising a salt of a polyvalent metal dissolved in a volatile solvent, evaporating the major portion of the volatile solvent, immersing the form in an aqueous rubber dispersion, and drying the rubber deposit thus formed.

13. The method of producing rubber articles which comprises coating an impervious form with a film of a solution of a salt of a polyvalent metal in a volatile organic solvent, evaporating the major portion of the volatile solvent, immersing the form in an aqueous rubber dispersion, and washing and drying the rubber deposit thus formed.

14. The method of producing rubber articles which comprises adding to a solution of a coagulant in a volatile solvent a non-volatile substance adapted to increase the viscosity of the residue after evaporation of the volatile solvent, applying a film of the solution to the surface of an impervious form, evaporating the major portion of the volatile solvent, and immersing the form in an aqueous rubber dispersion until a deposit of substantial thickness is formed.

15. The method of producing rubber articles which comprises adding to a solution of a crystallizable coagulant in a volatile solvent a non-volatile substance adapted to retard crystallization of the coagulant, applying a film of the solution to the surface of an impervious form, evaporating the major portion of the volatile solvent, and immersing the form in an aqueous rubber dispersion until a deposit of substantial thickness is formed.

16. The method of producing rubber articles which comprises adding to a solution of a crystallizable coagulent in a volatile organic solvent a non-volatile, water-soluble organic substance adapted to increase the viscosity of the residue after evaporation of the volatile solvent while retarding crystallization of the coagulant, applying a film of the solution to the surface of an impervious form, evaporating the major portion of the volatile solvent, and immersing the form in an aqueous rubber dispersion until a deposit of substantial thickness is formed.

17. The method of producing rubber articles which comprises adding to a solution of a salt of a polyvalent metal in a volatile organic solvent a non-volatile, water-soluble ester, applying a film of the solution to an impervious form, evaporating the major portion of the volatile solvent, and immersing the form in an aqueous rubber dispersion until a deposit of substantial thickness is formed.

In witness whereof I have hereunto set my hand this 13th day of December, 1929.

EDWARD A. WILLSON.